US010485030B2

(12) United States Patent
Hui et al.

(10) Patent No.: US 10,485,030 B2
(45) Date of Patent: Nov. 19, 2019

(54) METHOD AND APPARATUS FOR RECEIVING UPLINK SIGNAL IN TRAIN COMMUNICATION NETWORK

(71) Applicant: ELECTRONICS AND TELECOMMUNICATIONS RESEARCH INSTITUTE, Daejeon (KR)

(72) Inventors: Bing Hui, Daejeon (KR); Yeong Jin Kim, Daejeon (KR); Il Gyu Kim, Chungcheongbuk-do (KR); Jun Hwan Lee, Seoul (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 40 days.

(21) Appl. No.: 15/802,682

(22) Filed: Nov. 3, 2017

(65) Prior Publication Data
US 2018/0132283 A1    May 10, 2018

(30) Foreign Application Priority Data

Nov. 4, 2016 (KR) .................. 10-2016-0146744
Nov. 3, 2017 (KR) .................. 10-2017-0145889

(51) Int. Cl.
*H04W 36/00* (2009.01)
*H04W 72/04* (2009.01)
(Continued)

(52) U.S. Cl.
CPC ... *H04W 74/0833* (2013.01); *H04W 36/0005* (2013.01); *H04W 36/0077* (2013.01);
(Continued)

(58) Field of Classification Search
CPC .............. H04W 36/005; H04W 48/16; H04W 72/0453; H04W 74/004; H04W 74/0833; H04W 84/005
See application file for complete search history.

(56) References Cited

U.S. PATENT DOCUMENTS 8,406,781 B2 * 3/2013 Vujcic ................ H04W 72/048
370/329
8,805,383 B2    8/2014 Park
(Continued)

FOREIGN PATENT DOCUMENTS

EP        2309817 A1    4/2011
EP        2632060 A1 *  8/2013   ......... H04B 7/18506
WO    2005-022792 A2    3/2005

OTHER PUBLICATIONS

3GPP TR 38.913, "Technical Specification Group Radio Access Network; Study on Scenarios and Requirements for Next Generation Access Technologies", V14.0.0, (Oct. 2016).
(Continued)

*Primary Examiner* — Alpus Hsu
(74) *Attorney, Agent, or Firm* — LRK Patent Law Firm (57) ABSTRACT

A method and a terrestrial base station for receiving an uplink signal. The terrestrial base station is configured to: receive a preamble corresponding to an orthogonal pseudo-noise (PN) sequence of a plurality of the orthogonal PN sequences from an onboard base station in a train; recognize identification (ID) of the onboard base station from the preamble, and allocate a temporary network ID and an uplink grant (UL grant) to the onboard base station; and receive the uplink signal transmitted based on the temporary network ID and the UL grant.

18 Claims, 7 Drawing Sheets

(51) Int. Cl.
*H04W 74/00* (2009.01)
*H04W 74/08* (2009.01)
*H04W 48/16* (2009.01)
*H04W 84/00* (2009.01)

(52) U.S. Cl.
CPC ........ *H04W 72/0453* (2013.01); *H04W 48/16* (2013.01); *H04W 74/004* (2013.01); *H04W 84/005* (2013.01)

(56) References Cited

U.S. PATENT DOCUMENTS

| | | | | |
|---|---|---|---|---|
| 8,824,306 B2* | 9/2014 | Frenger | ............ | H04W 74/0833 370/241 |
| 9,060,281 B2* | 6/2015 | Issakov | ................ | H04W 24/00 |
| 9,444,557 B2* | 9/2016 | Aiba | ..................... | H04L 5/0048 |
| 9,462,612 B2* | 10/2016 | Hwang | ................ | H04L 5/0053 |
| 9,479,311 B2* | 10/2016 | Aiba | ..................... | H04L 5/0048 |
| 9,553,633 B2* | 1/2017 | Aiba | ..................... | H04B 1/7103 |
| 9,590,785 B2* | 3/2017 | Aiba | ..................... | H04L 5/0048 |
| 9,814,076 B2* | 11/2017 | Kim | .................. | H04W 74/0833 |
| 9,924,542 B2* | 3/2018 | Eriksson | ........... | H04W 74/0833 |
| 9,949,239 B2* | 4/2018 | Parkvall | ............... | H04W 74/004 |
| 10,009,204 B2* | 6/2018 | Wang | ................. | H04L 27/2613 |
| 10,034,308 B2* | 7/2018 | Lee | ................... | H04W 74/0833 |
| 10,165,599 B2* | 12/2018 | Mujtaba | ............ | H04W 72/0413 |
| 10,231,135 B2* | 3/2019 | Zhang | ................... | H04W 16/28 |
| 2016/0278127 A1 | 9/2016 | Sunell et al. | | |
| 2017/0359839 A1* | 12/2017 | Wang | ............... | H04W 74/0833 |

OTHER PUBLICATIONS

Hisilicon Huawei, "HST ad hoc minutes", 3GPP TSG-RAN WG4 Meeting #77, R4-158179, Anaheim, USA, Nov. 2015.

* cited by examiner

METHOD AND APPARATUS FOR RECEIVING UPLINK SIGNAL IN TRAIN COMMUNICATION NETWORK

CROSS-REFERENCE TO RELATED APPLICATIONS

This application claims priority to and the benefit of Korean Patent Application Nos. 10-2016-0146744 and 10-2017-0145889, filed in the Korean Intellectual Property Office on Nov. 4, 2016 and Nov. 3, 2017, respectively, the entire contents of which are incorporated herein by reference.

BACKGROUND OF THE INVENTION

1. Field of the Invention

This relates to a method and an apparatus for receiving an uplink signal in a train communication network.

2. Description of Related Art

Recently, a high speed scenario has been included in the 3GPP study item of new radio (NR) as a scenario of the enhanced mobile broadband (eMBB). For the high speed scenario in NR, directional network deployment has been adopted. There are two options for establishing a network access link between onboard user equipment (UE) and the network. The first option is for the onboard UE to directly access the terrestrial base station (BS), and the second option is to install an onboard BS to transfer data between the onboard UE and the terrestrial BS.

The above information disclosed in this Background section is only for enhancement of understanding of the background of the invention and therefore it may contain information that does not form the prior art that is already known in this country to a person of ordinary skill in the art.

SUMMARY OF THE INVENTION

The present disclosure has been made in effort to provide a method and an apparatus for receiving an uplink signal in train communication network.

An exemplary embodiment provides a method for receiving an uplink signal by a terrestrial base station. The method includes: receiving a preamble corresponding to an orthogonal pseudo-noise (PN) sequence of a plurality of orthogonal PN sequences from an onboard base station in a train; recognizing identification (ID) of the onboard base station from the preamble, and allocating a temporary network ID and an uplink grant (UL grant) to the onboard base station; and receiving the uplink signal transmitted based on the temporary network ID and the UL grant.

The method may further include determining a frame configuration for transmission of the uplink signal based on the orthogonal PN sequence corresponding to the preamble.

The determining a frame configuration for transmission of the uplink signal based on the orthogonal PN sequence corresponding to the preamble may include determining an index of an orthogonal PN sequence group to which the orthogonal PN sequence corresponding to the preamble belongs as an index of the frame configuration.

The recognizing ID of the onboard base station from the preamble may include recognizing an index of the orthogonal PN sequences as the ID of the onboard base station.

The recognizing ID of the onboard base station from the preamble may include recognizing the ID of the onboard base station from a payload which is multiplexed with the preamble.

The method may further include: obtaining an ID of the onboard base station from the uplink signal; and determining whether a random access of the onboard base station is for a network initial access, for a network re-access, or for a handover, by comparing the obtained ID with a previous ID of the onboard base station stored in advance.

The determining whether a random access of the onboard base station is for a network initial access, for a network re-access, or for a handover by comparing the obtained ID with a previous ID of the onboard base station stored in advance may include determining that the random access is for the network re-access if the obtained ID is the same as the previous ID.

The determining whether a random access of the onboard base station is for a network initial access, for a network re-access, or for a handover by comparing the obtained ID with a previous ID of the onboard base station stored in advance may include requesting a downlink packet sequence number from a neighbor terrestrial base station if the obtained ID is different from the previous ID.

The method may further include, after the requesting of a downlink packet sequence number from a neighbor terrestrial base station if the obtained ID is different from the previous ID, determining that the random access is for the handover when the downlink packet sequence number is received from the neighbor terrestrial base station.

The method may further include, after the requesting of a downlink packet sequence number from a neighbor terrestrial base station if the obtained ID is different from the previous ID, determining that the random access is for the network initial access when the downlink packet sequence number is not received from the neighbor terrestrial base station.

Another embodiment provides a terrestrial base station for receiving a uplink signal. The apparatus includes a processor, a memory, and a radio frequency (RF) unit, wherein the processor executes a program stored in the memory to perform: receiving, by using the RF unit, a preamble corresponding to an orthogonal pseudo-noise (PN) sequence of a plurality of orthogonal PN sequences from an onboard base station in a train; recognizing identification (ID) of the onboard base station from the preamble, and allocating a temporary network ID and an uplink grant (UL grant) to the onboard base station; and receiving, by using the RF unit, the uplink signal transmitted based on the temporary network ID and the UL grant.

The processor may execute the program to further perform determining a frame configuration for transmission of the uplink signal based on the orthogonal PN sequence corresponding to the preamble.

When determining a frame configuration for transmission of the uplink signal based on the orthogonal PN sequence corresponding to the preamble, the processor may perform determining an index of an orthogonal PN sequence group to which the orthogonal PN sequence corresponding to the preamble belongs as an index of the frame configuration.

When recognizing ID of the onboard base station from the preamble, the processor may perform recognizing an index of the orthogonal PN sequences as the ID of the onboard base station.

When recognizing ID of the onboard base station from the preamble, the processor may perform recognizing the ID of the onboard base station from a payload which is multiplexed with the preamble.

The processor may execute the program to further perform: obtaining an ID of the onboard base station from the uplink signal; and determining whether a random access of the onboard base station is for a network initial access, for a network re-access, or for a handover by comparing the obtained ID with a previous ID of the onboard base station stored in advance.

When determining whether a random access of the onboard base station is for a network initial access, for a network re-access, or for a handover by comparing the obtained ID with a previous ID of the onboard base station stored in advance, the processor may perform determining that the random access is for the network re-access if the obtained ID is same as the previous ID.

When determining whether a random access of the onboard base station is for a network initial access, for a network re-access, or for a handover by comparing the obtained ID with a previous ID of the onboard base station stored in advance, the processor may perform requesting a downlink packet sequence number from a neighbor terrestrial base station if the obtained ID is different from the previous ID.

The processor may execute the program to further perform, after the requesting a downlink packet sequence number from a neighbor terrestrial base station if the obtained ID is different from the previous ID, determining that the random access is for the handover when the downlink packet sequence number is received from the neighbor terrestrial base station.

The processor may execute the program to further perform, after the requesting a downlink packet sequence number from a neighbor terrestrial base station if the obtained ID is different from the previous ID, determining that the random access is for the network initial access when the downlink packet sequence number is not received from the neighbor terrestrial base station.

DETAILED DESCRIPTION OF THE EMBODIMENTS

Hereinafter, exemplary embodiments of the present disclosure will be described in detail with reference to the accompanying drawings so that those skilled in the art may easily practice the present disclosure. However, the present disclosure may be modified in various different ways and is not limited to embodiments described herein. In the accompanying drawings, portions unrelated to the description will be omitted in order to obviously describe the present disclosure, and similar reference numerals will be used to describe similar portions throughout the present specification. Throughout the specification, a user equipment (UE) may be called a terminal, mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like. Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In the present description, it is assumed that no random access collision occurs when an onboard BS accesses a network. This assumption is true because the total number of the onboard BSs which are simultaneously activated in a fast moving train in the same TRP is typically one. The random accesses collision may occur only when train crossing happens and these multiple trains are trying to access network through the same TRP simultaneously.

Figure 1:
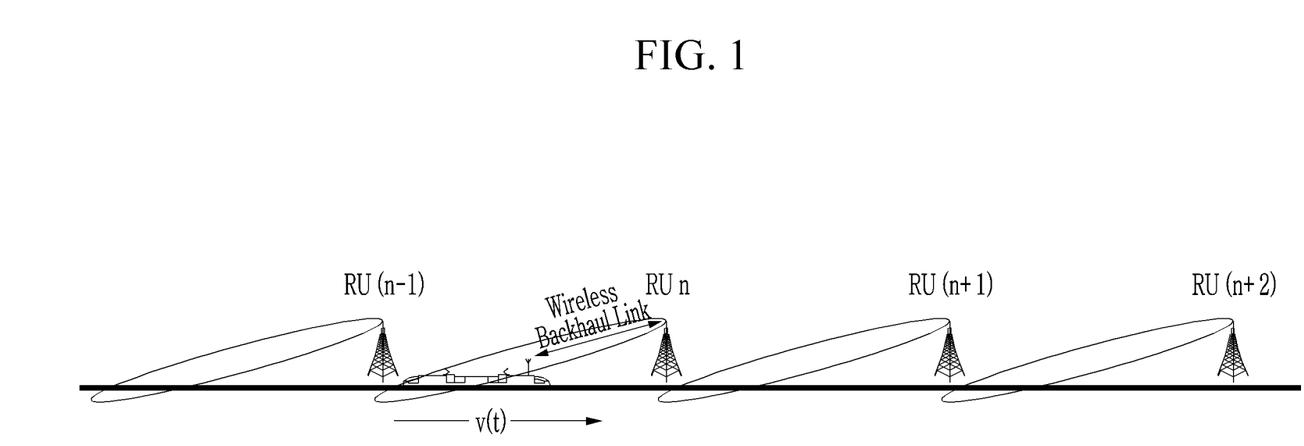
FIG. 1 is a diagram illustrating an example of directional network deployment for a train communication network according to an exemplary embodiment.
Figure 2:
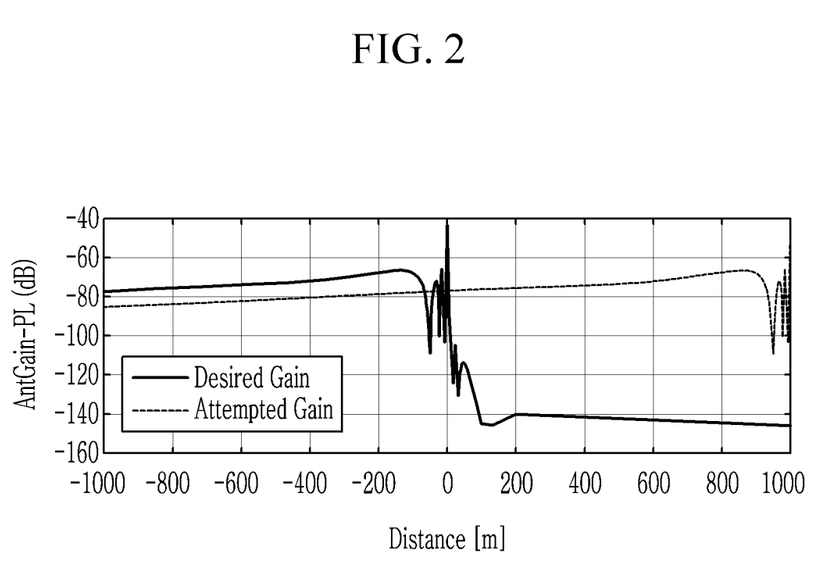
FIG. 2 is a graph illustrating gains of signals received from RUn and RUn+1 by the train of FIG. 1 according to the exemplary embodiment.
Figure 3:
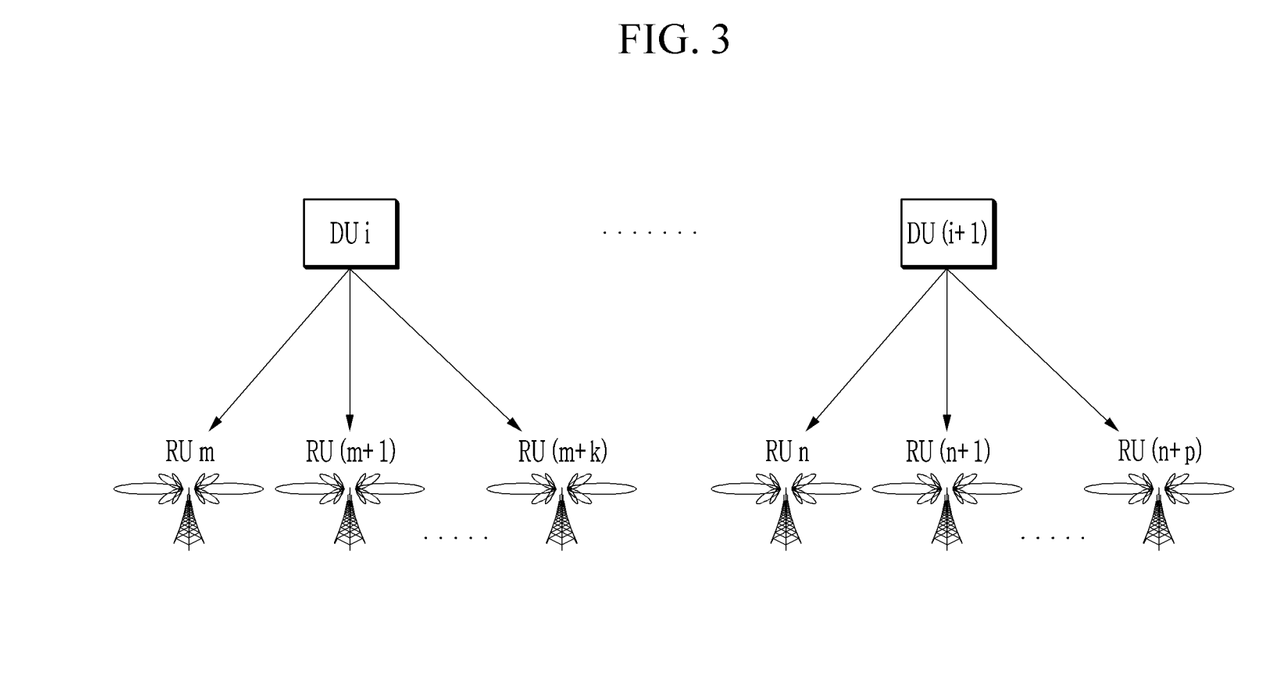
FIG. 3 is a diagram illustrating deployment of the terrestrial BS according to the exemplary embodiment.

FIG. 1 is a diagram illustrating an example of directional network deployment for a train communication network according to an exemplary embodiment, FIG. 2 is a graph illustrating gains of signals received from $RU_n$ and $RU_{n+1}$ by the train of FIG. 1 according to the exemplary embodiment, and FIG. 3 is a diagram illustrating deployment of the terrestrial BS according to the exemplary embodiment.

Referring to FIG. 1, a directional antenna is installed in the onboard BS and a radio unit (RU) of the terrestrial BS. Referring to FIG. 3, the terrestrial BS includes a digital unit (DU) connected to the least one RU.

In FIG. 1, the train moving from left to right is equipped with the onboard BS, so that the train is connected to the RU through the onboard BS by using wireless backhaul (VVBH). That is, the train according to an exemplary embodiment can avoid a group handover (HO) problem by using the onboard BS to which at least one UE is connected, instead of establishing a direct link between the at least one UE and the RU. Referring to FIG. 1, the RUs are deployed along a railroad track, each RU may manage at least one cell, and each cell may have a unique cell ID (identification). In FIG. 1, each RU may provide at least one cell in one direction (e.g., left direction). On the other hand, a plurality of RUs connected to the same DU may have the same cell ID and may provide services to the onboard BS in a single frequency network (SFN) manner. In both cases, a boundary of the cell generated by each RU may be a point at which the next RU or previous RU is located. In the exemplary embodiment, the term transmission/reception point (TRP) is used for both of the cases in which the RU has a unique cell ID and the plurality of RUs have the same cell ID. A TRP typically refers to a plurality of RUs with the same cell ID in the SFN or an RU with a unique cell ID.

According to the exemplary embodiment, a frequent handover problem need to be resolved because the train moves with very high mobility. At this time, the success rate of the random access for initial connection and the random access for handover should be guaranteed. Also, the network access delay of the network initial access and the radio link disconnection time of the handover should be minimized. Existing 3GPP LTE (LTE-A) systems are not designed for directional networks in high-speed scenarios because they are optimized for relatively low-speed scenarios (e.g., less than 350 km/h). There is therefore a need for a new dedicated random access method for the train communication network.

In FIG. 2, the antenna of the onboard BS in the train moving in the right direction communicates with the network, and three adjacent RUs are located at distances of −1000 m, 0 m and 1000 m, respectively. FIG. 2 shows the large-scale channel behavior within the three RU ranges in consideration of the free space path loss and the antenna gain of the directional antenna. In a directional network deployment, when the train performs a handover in a conventional random access manner, there is a high possibility that a radio link failure (RLF) occurs at the distance of 0 m. Since the signal from the source cell indicates strong reception power and the signal from the target cell indicates weak reception power until the train reaches the distance of 0 m, the onboard BS may not receive the handover command, or the target cell may not be reported to the source cell. A handover area (overlap area designed to handle measurement report and handover command) has been proposed to solve this problem. However, if the handover region is artificially created, potential ping-pong handover issues in the handover region should be considered, and the overall coverage may be reduced and the total number of sites may be increased due to the handover region.

Since the train communication system is a dedicated system, the onboard BS does not need to select a network for initial access. According to the exemplary embodiment, the onboard BS performs downlink synchronization and decodes system information (SI), and then performs a two-step random access procedure to access the network. At this time, it is assumed that the onboard BS has information on a Physical Random Access Channel (PRACH) configuration. Further the information on the PRACH configuration may include an instruction for timing to transmit the PRACH. Therefore, even if the onboard BS loses its link with the serving TRP due to out-of-coverage or the RLF, the onboard BS may be aware of the PRACH timing for attempting to re-access the network.

Figure 4:
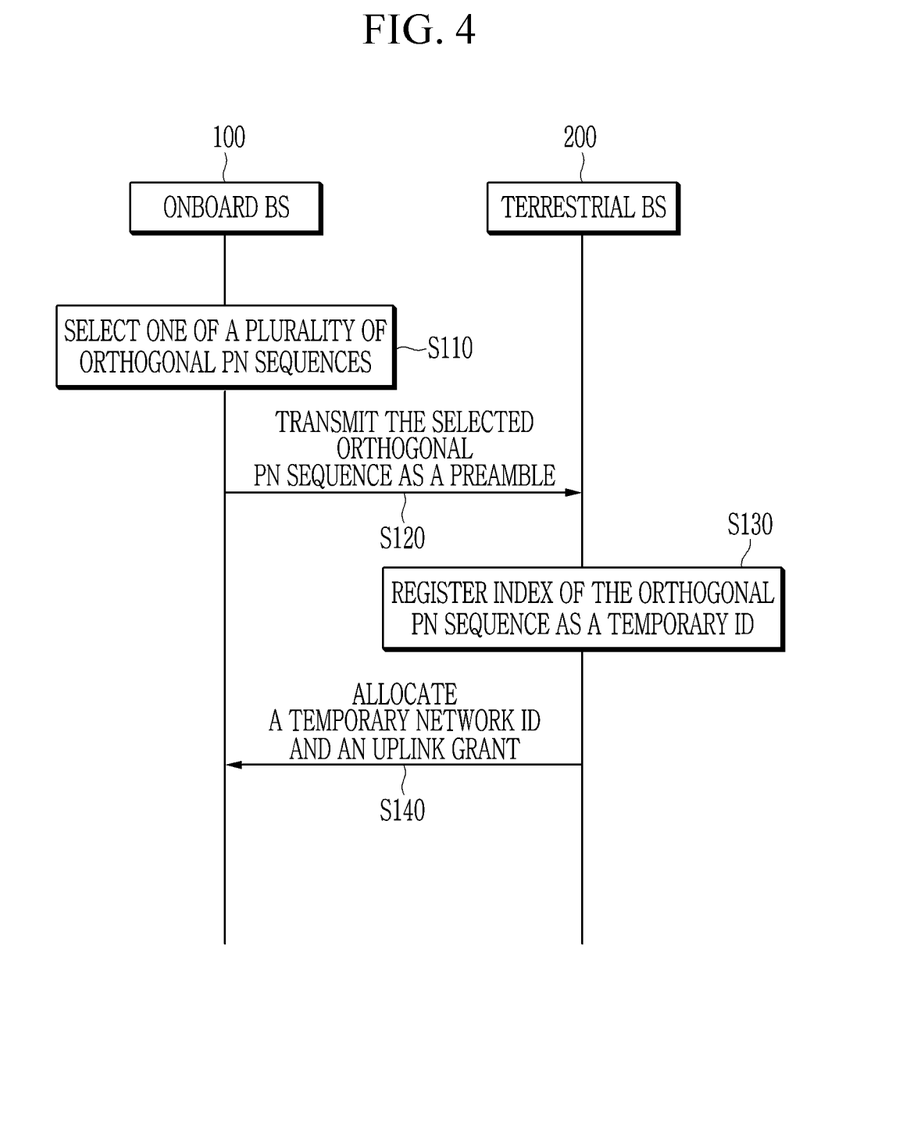
FIG. 4 is a flowchart illustrating a random access method according to an exemplary embodiment.

FIG. 4 is a flowchart illustrating a random access method according to an exemplary embodiment.

Referring to FIG. 4, an onboard BS 100 exchanges two messages with a terrestrial BS 200 to perform random access (a two-step random access procedure). The onboard BS 100 first transmits a message 1 requesting random access to the terrestrial BS 200. At this time, the onboard BS 100 may transmit a preamble as the message 1 to the terrestrial BS 200. The preamble may include a cyclic prefix (CP), an orthogonal pseudo-noise (PN) sequence (e.g., Zadoff-Chu sequence of the LTE system), and a guard time interval.

Further, it is assumed that X orthogonal PN sequences are available as the preamble. The indexes of the available orthogonal PN sequence are from 1 to X, and the orthogonal PN sequence indexes are known to the onboard BS 100 and the terrestrial BS 200 in priori.

When the onboard BS 100 transmits message 1, the onboard BS 100 randomly selects one of X orthogonal PN sequences to generate the preamble (S110). The onboard BS 100 transmits the selected orthogonal PN sequence as the preamble to the terrestrial BS 200 (S120). According to the exemplary embodiment, the index of the selected orthogonal PN sequence may be used as an ID of the onboard BS 100 (An implicit transmission method of the ID of the onboard BS). Alternatively, according to another exemplary, payload multiplexed with the preamble sequence may be used to carry the ID of the onboard BS 100 (An explicit transmission method of the ID of the onboard BS), wherein the payload may be multiplexed by a time division multiplexing (TDM) scheme, or a frequency division multiplexing (FDM) scheme, or a code division multiplexing (CDM) scheme. That is, in this case, the payload multiplexed with the preamble may include the ID of the onboard BS. In the foregoing description, the ID of the onboard BS 100 may be a temporary ID or a real ID (also referred to a permanent ID) of the onboard BS 100. Thereafter, the ID (hereinafter, temporary ID) recognized from the message 1 by the terrestrial BS 200 is stored in the terrestrial BS 200 during the random access procedure.

It is assumed that Y different frame configurations may be applied in the train communication system according to the exemplary embodiment. According to the exemplary embodiment, each frame configuration corresponds to a different ratio of the number of downlink resources and the number of uplink resources. In addition, the X orthogonal PN sequences may be grouped into Y different groups. In this case, a group index of the orthogonal PN sequence group may be used to carry information of the frame configuration. For example, there may be 16 different orthogonal PN sequences and 4 frame configurations. In this case, each orthogonal PN sequence group includes 4 orthogonal PN sequences, and each group corresponds to one frame configuration.

The onboard BS 100 may select one group index of the orthogonal PN sequence group and an index of an orthogonal PN sequence included in the group. In the above example, the 4 orthogonal PN sequence groups are {1, 2, 3, 4}, {5, 6, 7, 8}, {9, 10, 11, 12}, and {13, 14, 15, 16}. When the onboard BS 100 transmits the orthogonal PN sequence with index 9, the terrestrial BS 200 determines the temporary ID of the onboard BS 100 as 9 and determines the index of the requested frame configuration as 3. The orthogonal PN sequence with index 9 is included in the third orthogonal PN sequence group, and the terrestrial BS 200 determines the index of the orthogonal PN sequence group to which the orthogonal PN sequence corresponding to the preamble belongs as the index of the frame structure. That is, the terrestrial BS 200 may recognize the frame structure requested for the uplink transmission and the temporary ID based on one preamble actually transmitted by the onboard BS 100.

Upon receiving the message 1, the terrestrial BS 200 registers the index of the orthogonal PN sequence corresponding to the preamble as a temporary ID in the network (S130). Further, the terrestrial BS 200 allocates a temporary network ID (e.g., a Cell-Radio Network Temporary Identifier (C-RNTI) of the LTE system) and an uplink grant (UL grant) to the onboard BS 100 (S140). The onboard BS 100 may then transmit the uplink signal to the terrestrial BS 200 based on the temporary network ID and the uplink grant.

Figure 5:
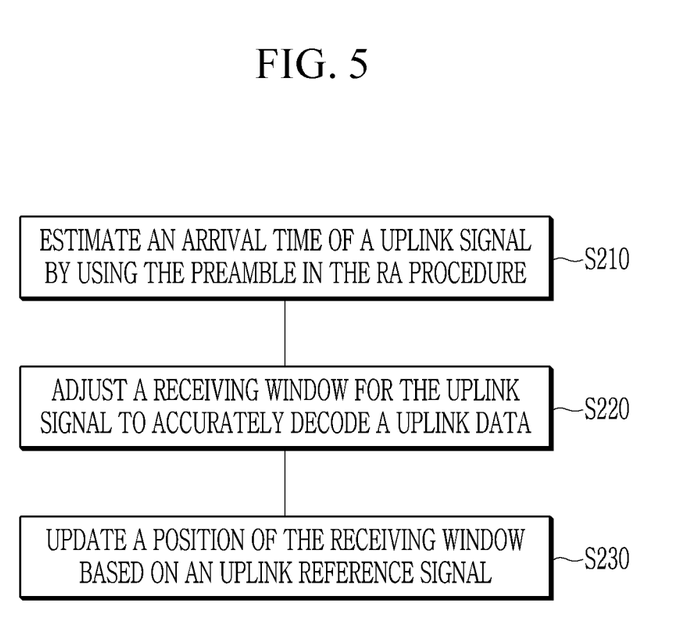
FIG. 5 is a flowchart illustrating an adjusting method of a receiving window for an uplink signal according to an exemplary embodiment.

FIG. 5 is a flowchart illustrating an adjusting method of a receiving window for an uplink signal according to an exemplary embodiment.

According to an exemplary embodiment, the terrestrial BS 200 may estimate an arrival time of the uplink signal using the preamble. After the arrival time is estimated, the terrestrial BS 200 may transmit the message 2 to the onboard BS 100. The message 2 according to the exemplary embodiment includes the temporary network ID and the uplink grant, and may not include a timing advance (TA). Unlike the LTE system in which the TA needs to be fed back to each UE for the uplink transmission, in the train communication system according to the exemplary embodiment, since one onboard BS is generally activated at a specific time, the TA is not necessarily be fed back to the onboard BS. Also, in the high-speed scenario, an error may easily occur when the onboard BS 100 decodes the TA information in the message 2, and the decoding error of the TA information leads to an uplink timing error. In addition, if the decoding error of the TA occurs, a considerable processing delay may occur when the onboard BS 100 acquires TA timing.

In a conventional random access procedure, TA has to be estimated and updated to perform uplink synchronization of a plurality of UEs. However, in the high-speed scenario, since there is generally only one onboard BS activated within the range of each cell for safety, the uplink synchronization need not to be synchronized for the plurality of onboard BSs.

According to the exemplary embodiment, since the message 2 does not include the TA, the terrestrial BS 200 dynamically adjusts a receiving window for the uplink signal to correctly decode uplink data after the RA procedure. Referring to FIG. 5, the terrestrial BS 200 estimates an arrival time of the uplink data by using the preamble in the RA procedure (S210), and adjusts a receiving window of the uplink signal based on the estimated arrival time (S220). Further, the terrestrial BS 200 updates a position of the receiving window based on an uplink reference signal (e.g., a sounding reference signal (SRS) of the LTE system, etc.) received after the RA (S230). According to the exemplary embodiment, the receiving window adjustment described above may be stopped when the connection between the terrestrial BS 200 and the onboard BS 100 is lost or the random access procedure is resumed to attempt to re-access the network by the onboard BS 100.

Since the message 2 does not include the TA, the following advantages may be expected. First, the processing time of the message 1 may be shortened, and the lengths of the message 1 and the message 2 may be reduced. The preamble of the message 1 may only include the temporary ID and the frame configuration request, so that it may not include additional information for estimation of the TA. Further, the processing time of the message 1 may be reduced since the message 2 may be transmitted before the estimation of the arrival time of the uplink signal is completed.

In high-speed scenarios, it is very difficult to accurately update the TA due to the high mobility of the train. Also, in high-speed scenarios, radio link disconnection time during the handover is very important so that the radio link disconnection time should be minimized. According to the exemplary embodiment, the message 2 may also be shortened since it does not include the TA information. As a result, the RA delay may be reduced and the radio link disconnection time of the handover may also be reduced. Also, because there is no TA feedback, the random access delay (i.e., radio link disconnection time) may be minimized. It is very important to minimize the random access delay since the onboard BS 100 in the high-speed scenario needs to re-access the network frequently due to the handover.

Figure 6:
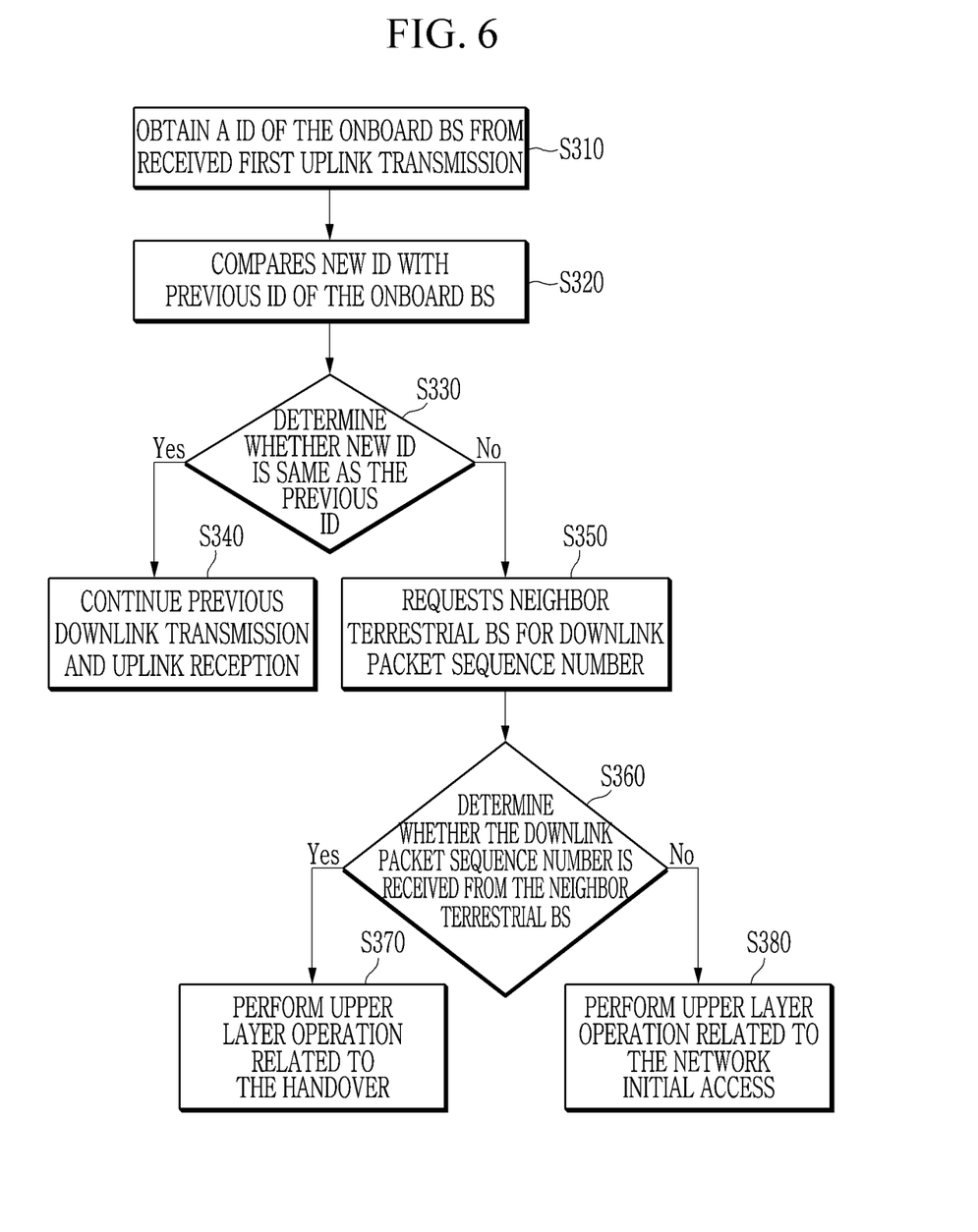
FIG. 6 is a flowchart illustrating an operation of the terrestrial BS after the random access according to an exemplary embodiment.

FIG. 6 is a flowchart illustrating an operation of the terrestrial BS after the random access according to an exemplary embodiment.

The two-stage random access procedure according to the exemplary embodiment may be applied to the network initial access, the network re-access, and the handover. The terrestrial BS 200 performs different operations in the case of the network initial access, the network re-access, and the handover after random access, respectively, and thus an operation of the upper layer such as the RRC layer may be determined accordingly. Referring to FIG. 6, after the terrestrial BS 200 receives the first uplink transmission from the onboard BS 100 after the random access, the terrestrial BS 200 obtains an ID of the onboard BS 100 from the received first uplink transmission (S310). The ID of the onboard BS 100 may be a permanent ID of the onboard BS 100 and may correspond to a UE ID in LTE, which is a 40-bit length TMSI or IMSI, etc. Then, the terrestrial BS 200 replaces the registered temporary ID (i.e., the orthogonal PN sequence index in the random access procedure or the ID may be included in the payload of the message 1) of the onboard BS 100 with the ID.

Thereafter, the terrestrial BS 200 compares the new ID with the previous ID of the onboard BS 100 stored in advance (S320). If the new ID is same as the previous ID (S330), the terrestrial BS 200 determines that the random access performed by the onboard BS 100 is for the network re-access, and continues the previous downlink transmission and the uplink reception (S340). However, if the new ID is different from the previous ID, the terrestrial BS 200 determines that the random access is for a new access and requests a downlink packet sequence number from neighbor terrestrial BSs (S350). The downlink packet sequence number may be a packet data convergence protocol (PDCP) sequence number of the LTE system. When the downlink packet sequence number is received from the neighbor terrestrial BS (S360), the terrestrial BS 200 performs an upper layer operation related to the handover (i.e., RRC connected state) (S370). That is, when receiving the downlink packet sequence number from the neighbor terrestrial BS, the terrestrial BS 200 determines that the random access performed is for the handover. However, when the downlink packet sequence number is not received from the neighbor terrestrial BS, the terrestrial BS 200 performs an upper layer operation related to the network initial access (i.e., the RRC idle state) (S380). That is, if the downlink packet sequence number is not received from the neighbor terrestrial BS, the terrestrial BS 200 determines that the random access is for the network initial access.

In the high-speed scenario, according to an exemplary embodiment, PRACH may be present in the first uplink resource in time domain of every transmission time interval (TTI) to minimize the random access delay. However, this may lead to a waste of the radio resources to assign so many PRACH resources. Based on the network access latency requirement, the PRACH configuration may be optimized so as to maximize the resource efficiency of the entire system.

For example, instead of broadcasting the PRACH configuration in system information (SI), the onboard BS may assume that PRACH is transmitted in every TTI by default. Alternatively, in order to maximize the system resource efficiency, the PRACH is transmitted for every Z TTIs. In this case, the connected onboard BS will be able to transmit its uplink data in (Z−1) of the assumed PRACH in every Z TTIs. At this time, when a new onboard BS attempts to access the network, there is a 1/Z probability of free PRACH which is used for PRACH transmission and a (Z−1)/Z probability of busy PRACHs which are not used for PRACH transmission but for PUSCH transmissions. Therefore, the average waiting time for successfully transmitting the RA message 1 may be (Z−1)/Z TTI [0×1/Z+1×(Z−1)/Z], and the resource efficiency is increased.

Figure 7:
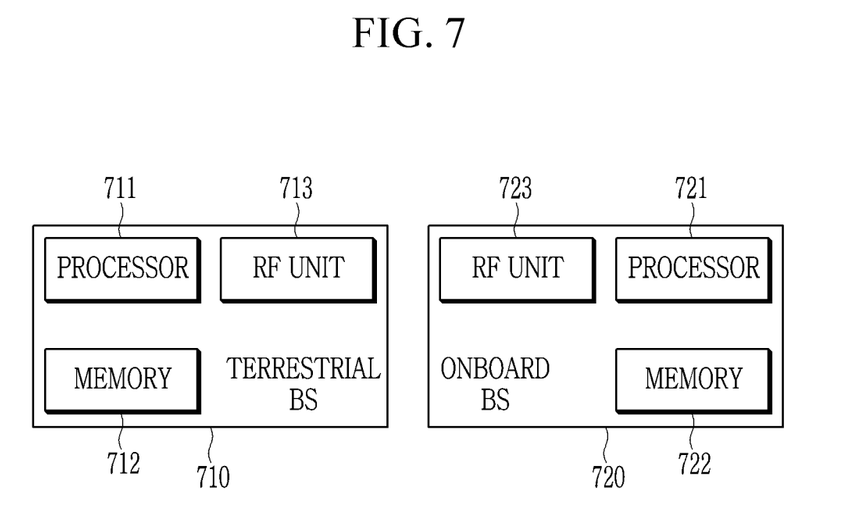
FIG. 7 is a block diagram illustrating a wireless communication system according to an exemplary embodiment.

FIG. 7 is a block diagram illustrating a wireless communication system according to an exemplary embodiment of the present disclosure. Referring to FIG. 7, a wireless communication system according to an exemplary embodiment includes a terrestrial BS 710 and an onboard BS 720. The terrestrial BS 710 includes a processor 711, a memory 712, and a radio frequency unit (RF unit) 713. The memory 712 may be connected to the processor 711 to store various pieces of information for driving the processor 711 or at least one program executed by the processor 711. The radio frequency unit 713 may be connected to the processor 711 to transmit/receive a wireless signal. The processor 711 may implement functions, processes, or methods proposed by the exemplary embodiment. In this case, in the wireless communication system according to the exemplary embodiment, a wireless interface protocol layer may be implemented by the processor 711. An operation of the terrestrial BS 710 according to the exemplary embodiment may be implemented by the processor 711.

The onboard BS 720 includes a processor 721, a memory 722, and a radio frequency unit (RF unit) 723. The memory 722 may be connected to the processor 721 to store various pieces of information for driving the processor 721 or at least one program executed by the processor 721. The radio frequency unit 723 may be connected to the processor 721 to transmit/receive a wireless signal. The processor 721 may implement functions, processes, or methods proposed by the exemplary embodiment. In this case, in the wireless communication system according to the exemplary embodiment, a wireless interface protocol layer may be implemented by the processor 721. An operation of the onboard BS 720 according to the exemplary embodiment may be implemented by the processor 721.

According to the exemplary embodiment of the present disclosure, the memory may be positioned inside or outside the processor and the memory may be connected to the processor through already known various means. The memory may be various types of volatile or non-volatile storage media. For example, the memory may include a read-only memory (ROM) or a random access memory (RAM). While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:

1. A method for receiving an uplink signal by a terrestrial base station, comprising:
    receiving a preamble corresponding to an orthogonal pseudo-noise (PN) sequence of a plurality of orthogonal PN sequences from an onboard wireless device in a train, wherein the onboard wireless device is connected with the terrestrial base station through a wireless backhaul link;
    recognizing an identification (ID) of the onboard wireless device from the preamble, storing the recognized ID of the onboard wireless device, and allocating a temporary network ID and an uplink grant (UL grant) to the onboard wireless device;
    receiving the uplink signal transmitted based on the temporary network ID and the UL grant;
    obtaining an ID of the onboard wireless device from the uplink signal; and
    determining whether a random access of the onboard wireless device is for a network initial access, for a network re-access, or for a handover, by comparing the obtained ID with the recognized ID of the onboard wireless device stored in advance.

2. The method of claim 1, further comprising:
    determining a frame configuration for transmission of the uplink signal based on the orthogonal PN sequence corresponding to the preamble.

3. The method of claim 2, wherein the determining a frame configuration for transmission of the uplink signal based on the orthogonal PN sequence corresponding to the preamble comprises: determining an index of an orthogonal PN sequence group to which the orthogonal PN sequence corresponding to the preamble belongs as an index of the frame configuration.

4. The method of claim 1, wherein the recognizing ID of the onboard base station wireless device from the preamble comprises recognizing an index of the orthogonal PN sequences as the ID of the onboard base station wireless device.

5. The method of claim 1, wherein the recognizing ID of the onboard base station wireless device from the preamble comprises recognizing the ID of the onboard base station wireless device from a payload which is multiplexed with the preamble.

6. The method of claim 1, wherein the determining whether a random access of the onboard wireless device is for a network initial access, for a network re-access, or for a handover by comparing the obtained ID with [a previous] the recognized ID of the onboard wireless device stored in advance comprises:
    determining that the random access is for the network re-access if the obtained ID is the same as the recognized ID.

7. The method of claim 1, wherein the determining whether a random access of the onboard wireless device is for a network initial access, for a network re-access, or for a handover by comparing the obtained ID with the recognized ID of the onboard wireless device stored in advance comprises:
    requesting a downlink packet sequence number from a neighbor terrestrial base station if the obtained ID is different from the recognized ID.

8. The method of claim 7, further comprising:
    after the requesting of a downlink packet sequence number from a neighbor terrestrial base station if the obtained ID is different from the recognized ID, determining that the random access is for the handover when the downlink packet sequence number is received from the neighbor terrestrial base station.

9. The method of claim 7, further comprising:
    after the requesting of a downlink packet sequence number from a neighbor terrestrial base station if the obtained ID is different from the recognized ID, determining that the random access is for the network initial access when the downlink packet sequence number is not received from the neighbor terrestrial base station.

10. A terrestrial base station for receiving an uplink signal, comprising:

a processor, a memory, and a radio frequency (RF) unit, wherein the processor executes a program stored in the memory to perform:

receiving, by using the RF unit, a preamble corresponding to an orthogonal pseudo-noise (PN) sequence of a plurality of orthogonal PN sequences from an onboard wireless device in a train, wherein the onboard wireless device is connected with the terrestrial base station through a wireless backhaul link;

recognizing an identification (ID) of the onboard wireless device from the preamble storing the recognized ID of the onboard wireless device, and allocating a temporary network ID and an uplink grant (UL grant) to the onboard wireless device;

receiving, by using the RF unit, the uplink signal transmitted based on the temporary network ID and the UL grants;

obtaining an ID of the onboard wireless device from the uplink signal; and determining whether a random access of the onboard wireless device is for a network initial access, for a network re-access, or for a handover, by comparing the obtained ID with the recognized ID of the onboard wireless device stored in advance.

11. The terrestrial base station of claim 10, wherein the processor executes the program to further perform determining a frame configuration for transmission of the uplink signal based on the orthogonal PN sequence corresponding to the preamble.

12. The terrestrial base station of claim 11, wherein when determining a frame configuration for transmission of the uplink signal based on the orthogonal PN sequence corresponding to the preamble, the processor performs: determining an index of an orthogonal PN sequence group to which the orthogonal PN sequence corresponding to the preamble belongs as an index of the frame configuration.

13. The terrestrial base station of claim 11, wherein when recognizing ID of the onboard wireless device from the preamble, the processor performs recognizing an index of the orthogonal PN sequences as the ID of the onboard wireless device.

14. The terrestrial base station of claim 11, wherein when recognizing ID of the onboard wireless device from the preamble, the processor performs recognizing the ID of the onboard wireless device from a payload which is multiplexed with the preamble.

15. The terrestrial base station of claim 10, wherein: when determining whether a random access of the onboard wireless device is for a network initial access, for a network re-access, or for a handover by comparing the obtained ID with the recognized ID of the onboard wireless device stored in advance, the processor performs determining that the random access is for the network re-access if the obtained ID is same as the recognized ID.

16. The terrestrial base station of claim 10, wherein: when determining whether a random access of the onboard wireless device is for a network initial access, for a network re-access, or for a handover by comparing the obtained ID with the recognized ID of the onboard wireless device stored in advance, the processor performs requesting a downlink packet sequence number from a neighbor terrestrial base station if the obtained ID is different from the recognized ID.

17. The terrestrial base station of claim 16, wherein the processor executes the program to further perform: after the requesting a downlink packet sequence number from a neighbor terrestrial base station if the obtained ID is different from the recognized ID, determining that the random access is for the handover when the downlink packet sequence number is received from the neighbor terrestrial base station.

18. The terrestrial base station of claim 16, wherein the processor executes the program to further perform: after the requesting a downlink packet sequence number from a neighbor terrestrial base station if the obtained ID is different from the recognized ID, determining that the random access is for the network initial access when the downlink.

* * * * *